United States Patent [19]
Watkins

[11] Patent Number: 5,793,179
[45] Date of Patent: Aug. 11, 1998

[54] SENSORLESS ROTOR POSITION MONITORING IN RELUCTANCE MACHINES

[75] Inventor: Stephen James Watkins, Leeds, England

[73] Assignee: Switched Reluctance Drives Limited, North Yorkshire, England

[21] Appl. No.: 772,029

[22] Filed: Dec. 19, 1996

[30] Foreign Application Priority Data

Dec. 19, 1995 [GB] United Kingdom ............... 9525952

[51] Int. Cl.$^6$ ........................................ H02P 7/05
[52] U.S. Cl. ........................................ 318/701
[58] Field of Search ............... 324/207.15, 207.16, 324/207.25; 318/701, 254, 138, 439

[56] References Cited

U.S. PATENT DOCUMENTS

| | | | |
|---|---|---|---|
| 5,015,939 | 5/1991 | Konecny | 318/701 |
| 5,107,195 | 4/1992 | Lyons et al. | 318/701 |
| 5,530,333 | 6/1996 | Turner | 318/701 |
| 5,537,019 | 7/1996 | Van Sistine et al. | 318/701 |
| 5,627,445 | 5/1997 | Webster | 318/701 |

FOREIGN PATENT DOCUMENTS

| | | |
|---|---|---|
| 0 534 761 A1 | 3/1993 | European Pat. Off. |
| 0 573 198 A1 | 12/1993 | European Pat. Off. |
| 0 603 071 A2 | 6/1994 | European Pat. Off. |
| WO 91/02401 | 2/1991 | WIPO |

OTHER PUBLICATIONS

J.P. Lyons, et al., "Flux/Current Methods For SRM Rotor Position Estimation," *Institute of Electrical and Electronics Engineers*, vol. 1, Jan. 1, 1991, pp. 482-487.

C. Pollock, et al., "Acoustic Noise Cancellation Techniques for Switched Reluctance Drives," *Institute of Electrical and Electronics Engineers*, vol. 1, Oct. 8, 1995, pp. 448-455.

Stephenson, Dr. J.M. "The Characteristics, Design and Applications of Switched Reluctance Motors and Drives," PCIM '93 Conference & Exhibition, Nurnberg, Germany, Jun. 21-24, 1993.

Ray, W.F., et al. "Sensorless Methods for Determining the Rotor Position of Switched Reluctance Motors," EPE Brighton, 1993.

Mvungi, N.M., et al. "Accurate Sensorless Rotor Position Detection in an SR Motor," EPE Firenze, 1991.

*Primary Examiner*—Gerard R. Strecker
*Attorney, Agent, or Firm*—Patterson & Keough, P.A.

[57] ABSTRACT

A method of and apparatus for monitoring rotor position in a reluctance machine includes determining the rate of change of current at a particular point at which current in the winding is arranged to freewheel. Preferably the point coincides with alignment of a rotor and a stator pole such that the rate of change of current is predicted to be zero. The magnitude and polarity of any variation from the predicted rate of change indicates a rotor position removed from the actual rotor position and whether it is in advance of, or retreated from, the predicted position.

17 Claims, 9 Drawing Sheets

SENSORLESS ROTOR POSITION MONITORING IN RELUCTANCE MACHINES

BACKGROUND OF THE INVENTION

1. Field of the Invention.

This invention relates to sensorless rotor position monitoring in reluctance machines, particularly switched reluctance machines.

2. Description of Related Art

The performance of a switched reluctance machine depends, in part, on the accurate timing of phase energization with respect to rotor position. Detection of rotor position is conventionally achieved by using a transducer, such as a rotating toothed disk mounted on the machine rotor which co-operates with an optical or magnetic sensor mounted on the stator. A pulse train indicative of rotor position relative to the stator is fed back to control circuitry, allowing accurate phase energization.

This system is simple and works well in many applications. However, the rotor position transducer increases the overall cost of assembly, adds extra electrical connections to the machine and is, therefore, a potential source of unreliability. A variety of methods for dispensing with the rotor position transducer has been proposed. These are reviewed in "Sensorless Methods for Determining the Rotor Position of Switched Reluctance Motors" by W F Ray and I H Al-Bahadly, published in the Proceedings of The European Power Electronics Conference, Brighton, UK, 1993, Vol. 6, pp 7–13, which is incorporated herein by reference.

Many methods proposed for rotor position estimation use the measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 1. The storage of this data involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 2 in which the current and inductance waveforms are shown over a phase inductance period. As is well known, the inductance of the phase windings of a switched reluctance machine varies cyclically with rotor position. The period of the cycle corresponds to a rotor pole pitch, i.e. the inductance can be depicted as a cyclical function of either rotor position or time. This is a phase inductance cycle or period. These methods usually employ diagnostic energization pulses in non-torque-productive phases (i.e. those phases which are not energized directly from the power supply at a particular moment).

Other methods operate in the "single-pulse" mode of energization at higher speeds. This mode is illustrated in FIG. 3 in which the current and inductance waveforms are shown over a phase inductance period. These methods monitor the operating voltages and currents of an active phase without interfering with normal operation.

The control and operation of switched reluctance machines generally are described in the paper "The Characteristics, Design and Applications of Switched Reluctance Motors and Drives" by J M Stephenson and R J Blake delivered at the PCIM '93 Conference and Exhibition held in Nurnberg, Germany between 21 and 24 June 1993, which paper is incorporated herein by reference. In that paper the "chopping" and "single-pulse" modes of energization of switched reluctance machines are described.

A method suited to low-speed operation is that proposed by N M Mvungi and J M Stephenson in "Accurate Sensorless Rotor Position Detection in an S R Motor", published in Proceedings of the European Power Electronics Conference, Firenze, Italy, 1991, Vol. 1, pp 390–393, which publication is incorporated by reference. A typical higher speed method is described in International Patent Application WO 91/02401, which is incorporated herein by reference.

Having to store a two-dimensional array of machine data is an obvious disadvantage and so alternative methods have been proposed which avoid the need for the majority of angularly referenced information and instead store data at one angle only. Such a method is described in European Patent Application EP-A-0573198, which is incorporated herein by reference. This method aims to sense the phase flux-linkage and current at a predefined angle by adjusting the diagnostic point via the calculated deviation away from the desired point. Two one-dimensional tables are stored in the preferred embodiment, one of flux-linkage versus current at a referenced rotor angle (see FIG. 4) and another of the differential of flux-linkage with respect to rotor angle versus current. By monitoring phase voltage and current, the deviation away from a predicted angle can be assessed, with the aid of the look-up tables, and system operation can be adjusted accordingly. However, such methods, although reducing the amount of information which has to be stored, still have to detect or compute the flux-linkage at a specific rotor angle.

SUMMARY OF THE INVENTION

It is an object of the present invention to provide a generally applicable way of monitoring rotor position without using a rotor position transducer while also reducing the amount of stored data.

Embodiments of the invention use phase current freewheeling over a portion of the rotor angular movement, during which the rate of change of current is monitored. This monitoring may be carried out in any part of the phase inductance cycle. However, one particularly advantageous interval is at or near the fully aligned position of the rotor and stator poles.

The skilled person will be aware that the phase inductance cycle is the period of the variation of inductance for the or each phase of a switched reluctance machine, for example between maxima when the rotor poles and the relevant respective stator poles are fully aligned.

The skilled person will be aware of the concept of freewheeling in a switched reluctance machine. It is described in the PCIM '93 paper by Stephenson and Blake referred to above. Briefly, freewheeling is when the voltage across a phase winding of a switched reluctance machine is set to zero for a period of time by effectively providing a short-circuit path across the ends of the winding. The current circulates around the winding and the flux is virtually constant, since the only voltage present to change it is the voltage drop across the winding and the switching devices. The concept of freewheeling should not be confused with coasting in which there is no current in the winding and the rotation of the rotor relies only on its own momentum.

BRIEF DESCRIPTION OF THE DRAWINGS

The present invention can be put into practise in various ways some of which will now be described by way of example with reference to the accompanying drawings in which.

DETAILED DESCRIPTION OF PREFERRED EMBODIMENTS

Figure 1:
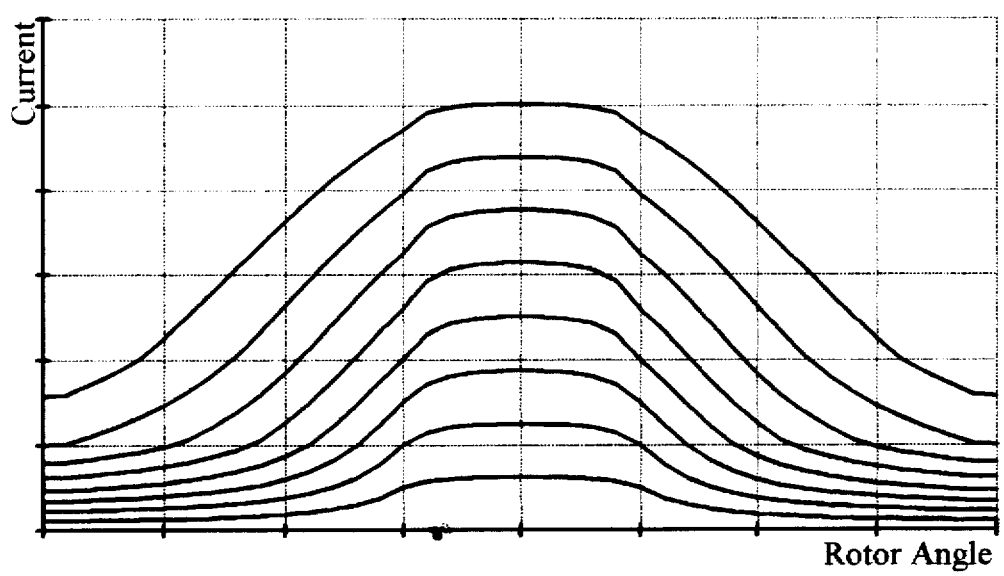
FIG. 1 is a graphical representation of the twodimensional stored table of flux-linkage/angle/current data used in prior art current monitoring systems.
Figure 2:
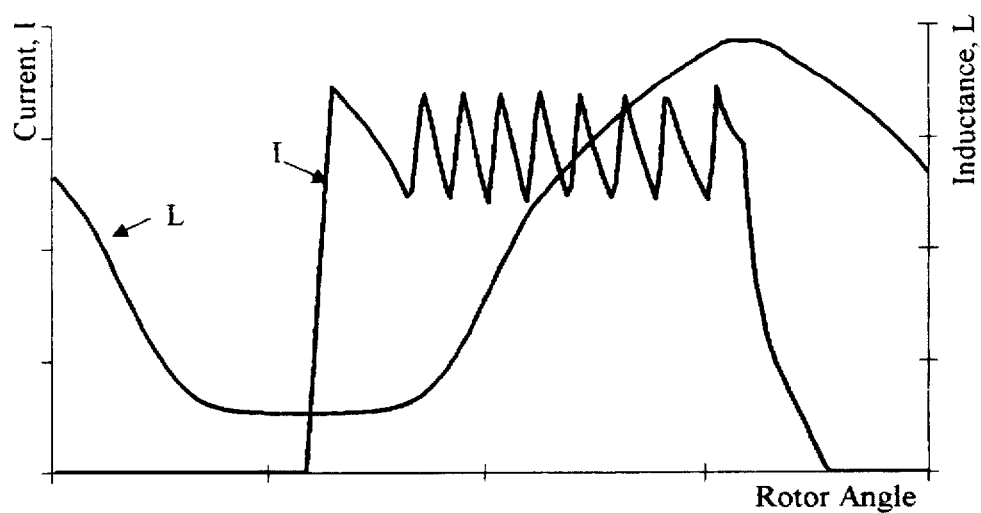
FIG. 2 shows a typical low-speed mode chopping current waveform superimposed on the phase inductance profile.
Figure 3:
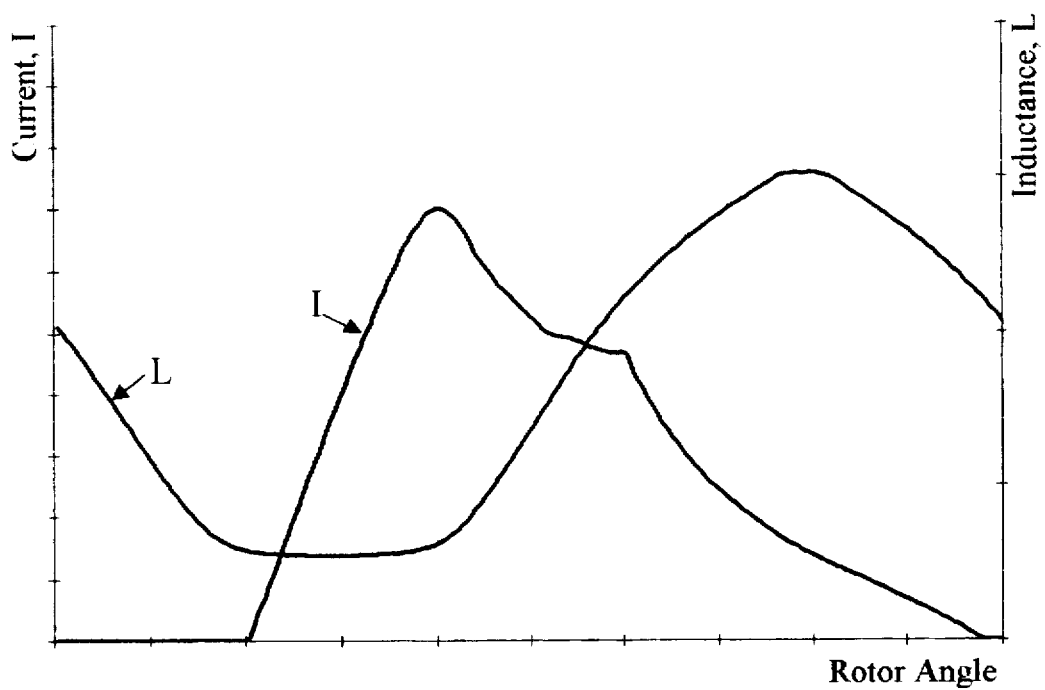
FIG. 3 shows a typical high-speed mode single-pulse current waveform superimposed on the phase inductance profile.
Figure 4:
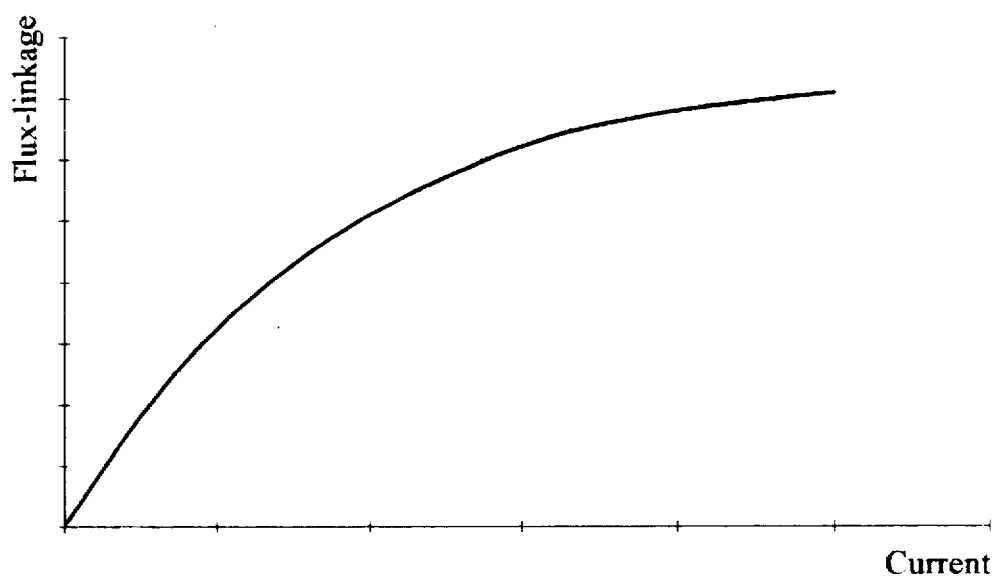
FIG. 4 is a graph of a single dimension of stored data according to another prior art system.

In a switched reluctance machine, the relationship between flux-linkage ψ and the current i can be expressed by the equation $$\psi = i L \quad (1)$$

where the inductance L is a function of angle θ and current i.

Differentiating equation (1) with respect to θ, the following relationship is obtained $$\frac{d\psi}{d\theta} = \frac{di}{d\theta} \cdot L + \frac{dL}{d\theta} \cdot i \quad (2)$$

Equation (2) can be rearranged to give the following equation $$\frac{di}{d\theta} = \frac{1}{L} \cdot \left[ \frac{d\psi}{d\theta} - \frac{dL}{d\theta} \cdot i \right] \quad (3)$$

In freewheeling mode, the voltage across the phase winding will be low and $d\psi/d\theta \approx 0$, therefore equation (3) can be approximated to the equation $$\frac{di}{d\theta} \approx -\frac{dL}{d\theta} \cdot \frac{i}{L} \quad (4)$$

For a fixed small angle Δθ the following relationship is applicable:

$$\Delta i \alpha - \Delta L \quad (5)$$

where the constant of proportionality is i/L.

It follows from equation (5) that, if the change of current (Δi) can be measured with suitable accuracy, this will give an indication of the change of inductance of the phase during the interval of measurement. If the relationship between the rate of change of inductance and the rotor position is already known, this allows a calculation of rotor position to be made from the measurement of Δi. The simplest method of implementing this is to use a look-up table of ΔL against rotor position. However, since in general the inductance is current dependent, this requires a table of ΔL as a function of current.

According to an embodiment of the invention in its preferred form, use is made of the fact that, at the fully aligned position of a rotor pole with respect to a stator pole, the rate of change of inductance with angle is essentially zero irrespective of the level of phase current. Thus, according to equation (5), the rate of change of phase current will be zero when the freewheel period is positioned around this fully aligned position. It therefore follows that, if during the monitoring interval Δi is discovered to be zero, the rotor position was centered around the aligned position during the measurement interval. This allows operation of the machine by predicting when the rotor will pass through the aligned position and freewheeling around that interval. If the prediction is correct, then Δi will be zero during the freewheel period. If, however, there is an angular error in the prediction, then the sign and the magnitude of rate of change of current will indicate the angular error and its direction and, therefore, the correction required for the next cycle.

Figure 6:
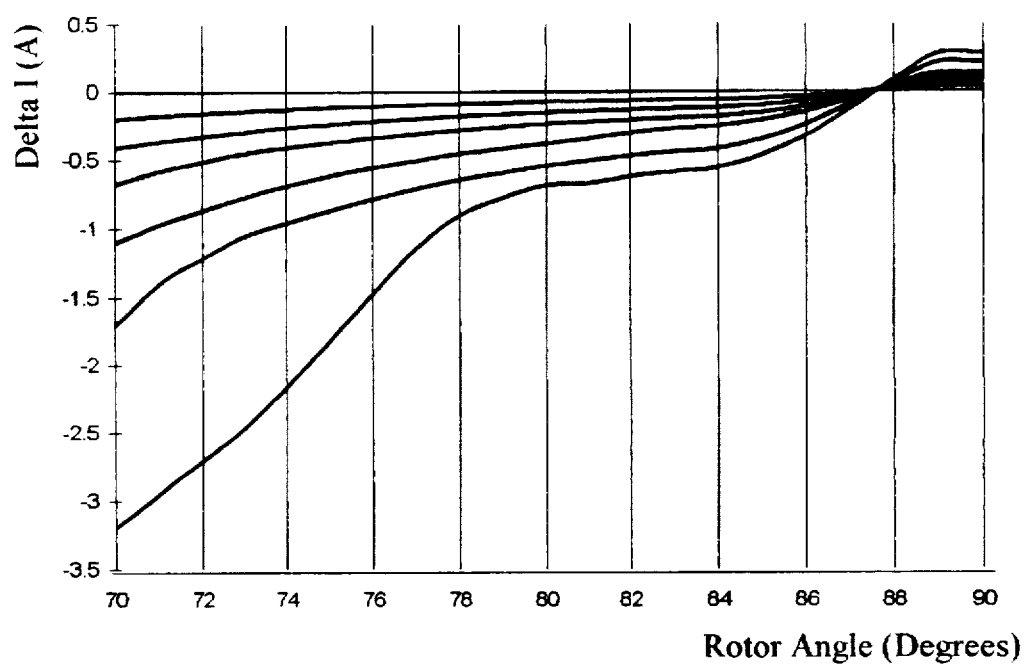
FIG. 6 shows a typical variation of change in current with respect to rotor angle for a fixed freewheel period for varying flux-linkage levels.

In practice, there is a finite reduction in flux-linkage ψ over the measurement interval and so the position at which there is no change in current will be slightly offset from the fully aligned position. This can be determined from equation (3) and is shown graphically by the set of curves in FIG. 6 for a typical switched reluctance motor. In the graph the actual position of zero rate of change of current is about 2½° before the fully aligned position of the rotor with respect to the stator pole.

Figure 5:
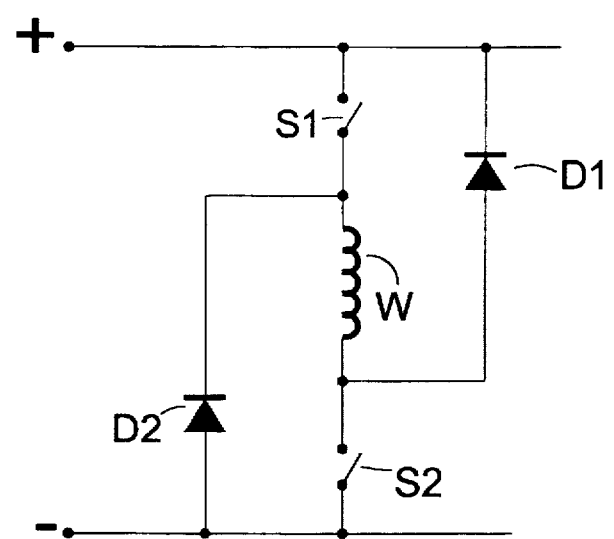
FIG. 5 shows an asymmetric half-bridge switch circuit for one phase of a switched reluctance machine.

FIG. 5 shows a conventional, asymmetric half-bridge converter circuit for a switched reluctance machine. A phase winding W is serially connected between an upper power switch S1 and a diode D1. The same winding W is similarly serially connected between a lower power switch S2 and its diode D2. By way of example of the freewheeling referred to above, if the circuit of FIG. 5 is used, current flowing through the winding W as a consequence of closing the switches S1 and S2 can be made to freewheel around the loop of S2 and D2 by opening S1.

The method of embodiments of the invention will not interfere to any substantial extent with the machine's operation because the required monitoring interval is short. In any case, it is beneficial to have a period of freewheeling in most known switched reluctance systems, for reasons associated with noise control and optimum efficiency of operation. It follows that this invention can be implemented in either the chopping or single-pulse modes of operation where it is possible for a freewheeling interval to be used. Embodiments of the invention could equally well be used in a continuous current mode of operation of a switched reluctance machine as is described in EP-A-0534761, which is incorporated herein by reference.

The method of embodiments of the invention gives timing information which is similar to that of a standard rotor position transducer, i.e. an indication of rotor/stator alignment is available once per phase inductance cycle.

Figure 7:
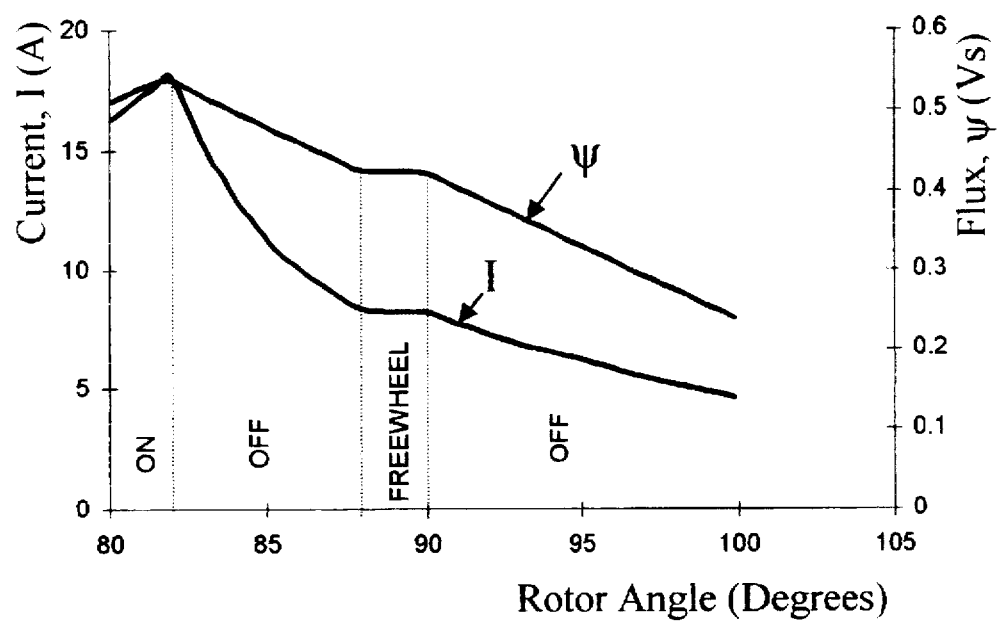
FIG. 7 demonstrates a 2° period of freewheeling for a switched reluctance machine about the fully aligned position of a rotor pole with respect to a stator pole, and the resulting variation of flux-linkage and current.

FIG. 7 illustrates the effect on the flux-linkage and current of a 2° freewheel period positioned adjacent the fully aligned position in a typical switched reluctance drive. As can be seen, both current and flux remain substantially constant for the duration of the freewheel interval which, in this case, is between 88° and 90°, where 90° indicates alignment between the rotor and stator poles.

Figure 8:
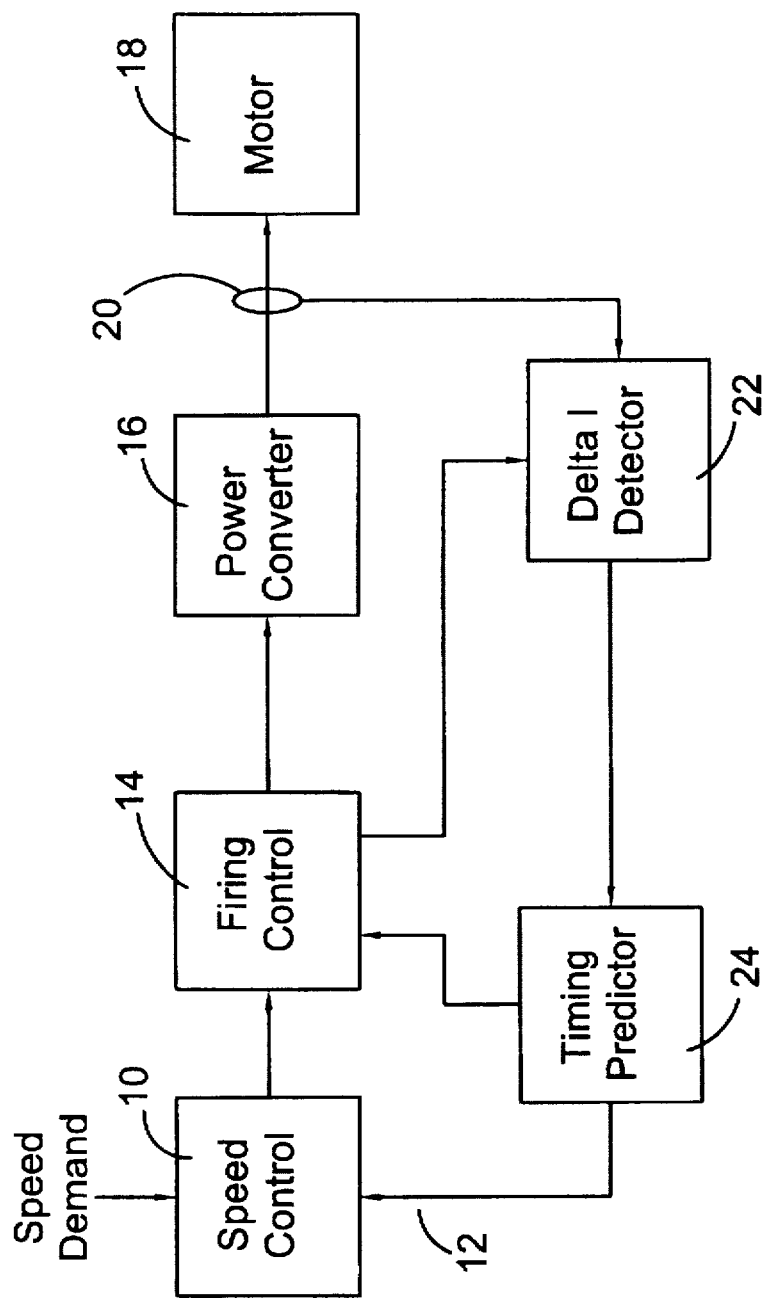
FIG. 8 shows a schematic diagram illustrating a control circuit incorporating an embodiment of the present invention.

FIG. 8 illustrates a drive system for a switched reluctance motor according to an embodiment of the invention. The system is shown in schematic block diagram form. In this embodiment, the speed controller 10 receives a speed demand signal. This is compared with a feedback signal on line 12 which will be described below. The output of the speed controller 10 is a comparison of the demanded and actual speed signals (i.e. an error signal) and is supplied as the actuating input to a firing controller 14.

As described above, there are various modes of operating a switched reluctance machine. In each mode of operation, a monitoring interval can be introduced, during which the current is allowed to freewheel.

The output of the speed controller 10 is the demand signal for the switch firing controller 14 that is conventional in the art in as much as it controls actuation of the switches of a power converter 16 according to the demand and the mode of control for the speed of the motor. The speed and firing controllers 10 and 14 can be implemented around a Motorola 68HC11 microcontroller, according to known art. The firing controller 14 output is modified according to an embodiment of the invention to include, in each phase inductance cycle, the regular monitoring commands for the switches of the converter 16.

The output of the firing controller is used to control actuation of the switches of the power converter 16, which can be of the type shown in FIG. 5, for each phase of the machine.

Phase current sensing is performed via a conventional current sensor 20 eg. a flux-nulling sensor as manufactured by LEM HEME Ltd of Skelmersdale, Lancashire, UK or by measuring the voltage developed across a series resistor. In embodiment of this invention it is the freewheel current that the sensor is required to monitor. Thus, the sensor must be located in an appropriate place where the freewheel current will exist in a reliable and accessible form, eg. at either end of winding W. Alternatively, the current could be monitored either at the diode D2 or the switch S2 used in the freewheel operation. The position at or near the switch S2 is preferred, as it is usually more accessible in practical implementations of switched reluctance machines.

If, however, it is required (for other control reasons) to cause the freewheeling current to flow in either half of the half-bridge converter of FIG. 5, the sensor needs to be placed adjacent the phase winding W.

Whereas current is monitored in the phase winding, the rate of change of current over a period must be measured for a meaningful indication of rotor position. The output of the sensor 20 indicative of current magnitude is applied to a current change detector 22. This is preferably implemented in the microprocessor which is used to implement the speed control and firing control functions described above. The implementation would, in principle, store a first value of current after freewheeling has commenced and store a second value of current near the end of the freewheeling interval. The rate of change of current is then computed by taking the difference of those current values and dividing by the time interval between them. In practice, it may be beneficial to take the first reading immediately before freewheeling commences, so as to avoid any transient disturbance in the current value caused by the switching action. The output of the detector 22 is a voltage indicative of the rate of change of current with respect to time over the monitoring interval. This is the basis of the indication of the position of the rotor relative to the stator. If the previous prediction of rotor position was correct, the output of the detector will be indicative of substantially zero current change during the monitoring interval.

The output of a detector 22 is applied to a timing predictor 24 that is responsive to the actual rate of change of current derived from the monitored current. For a given speed, the timing predictor 24 is able to predict the moment of alignment of the next phase of the machine, i.e. from a corrected assessment of rotor position in one phase, a prediction is made by the predictor for the next incidence of zero current change in the next phase to be energized.

The firing controller 14 includes a free-running timer which is used to set the angular position of the switch firing events. By deriving information from the rotor position data the timer is reset for each phase according to the firing control strategy which is part of the known principles of switched reluctance motor control. For a given speed, the timing predictor 24 makes a prediction of the time at which the rotor will be aligned with the stator. It is then able to decide the times during which the power converter should be put into the freewheeling mode, these times being selected so that the monitoring interval is centred around the predicted point of alignment. When the start of the monitoring interval arrives, the firing controller 14 actuates the current change detector 22 to read the output of the sensor 20 and the rate of change of current in the freewheeling mode is then calculated for the monitoring interval. At the end of the imposed freewheeling interval, the firing controller resumes conventional control of the motor, based on speed demand and the error signal.

If the rate of change of current assessed by the detector 22 is substantially zero, the timing predictor has no need to adjust its ongoing estimates of the aligned position for each phase. If the detector indicates a rate of change of current of negative slope and a particular magnitude, the predicted position of alignment was too early by an amount related to the magnitude of the rate of change of current. If the slope is positive, the predicted position of alignment was too late. The variation in change of current about zero can, therefore, be used as a simple linear scaling for correcting the estimate of the time at which alignment will occur.

For successful operation, this method requires the machine to be rotating and have current in at least one phase winding. At standstill, this method cannot be directly applied, but other known methods of starting the machine can be used, eg. open-loop stepping, diagnostic pulses, etc, all as known to those familiar with the art.

Figure 9:
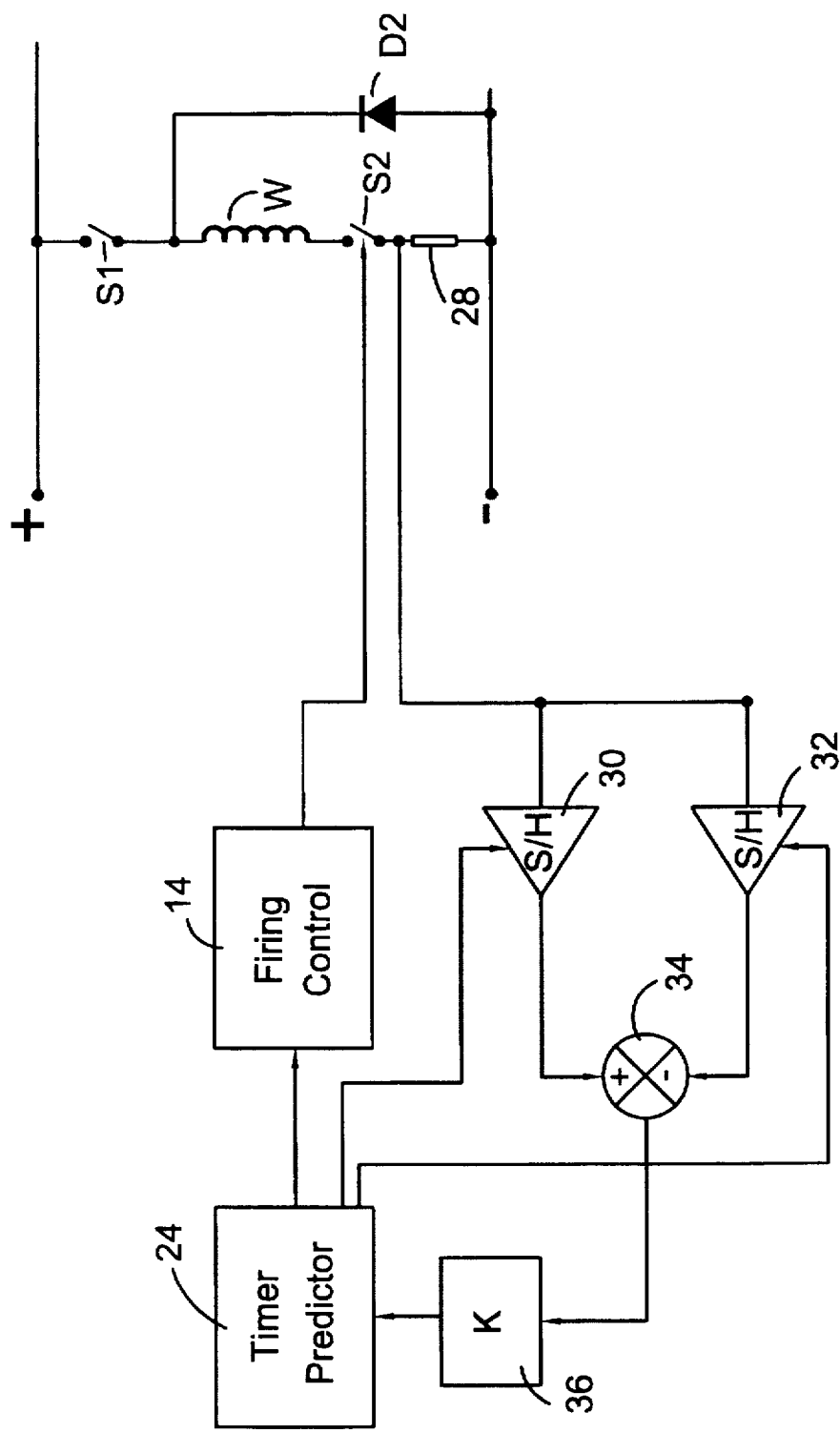
FIG. 9 shows a schematic diagram of further detail of a control system incorporating an embodiment of the present invention.

FIG. 9 illustrates an alternative implementation of the current change detector 22 using analogue components; the firing controller 14; and the half of the power converter 16 used for freewheeling constituted by the switch S2 and the diode D2. In this embodiment the freewheeling current is derived from the voltage developed across a small resistor 28, eg. <10Ω, in series with the switch of the freewheeling circuit. The voltage across the resistor is directly proportional to the current in the winding and is monitored by first and second sample-and-hold circuits 30 and 32 providing outputs to a summing junction 34. The difference between the sample-and-hold outputs is scaled in a scaler 36 and applied to the timing predictor 24. The first sample-and-hold circuit is actuated by the timing predictor 24 at the start of the chosen freewheel interval. The second sample-and-hold circuit is actuated at the end of the monitoring interval.

The above examples address the operation of embodiments of the invention when the switched reluctance machine is arranged to run as a motor. Embodiments of the present invention can also be used in the same way when the switched reluctance machine is running as a generator to equal effect. Of course, while embodiments of the invention are described in relation to rotary switched reluctance machines, the skilled person will be aware that a switched reluctance machine can be constructed as a linear motor. The moving member of a linear motor is referred to in the art as a rotor. The term "rotor" used here is intended to embrace the moving member of a linear motor as well.

Accordingly, while the invention has been described in connection with the illustrated embodiments discussed above, those skilled in the art will recognize that many variations may be made without departing from the present invention. The above description of the several embodiments is made by way of example and not for purposes of limitation. The present invention is intended to be limited only by the spirit and scope of the following claims.

What is claimed is:

1. A method of monitoring rotor position in a reluctance machine comprising a stator having at least one phase winding, and a rotor that is moveable relative to the stator to produce a cyclical change in the inductance of the phase winding as the rotor moves, the method comprising:

moving the rotor relative to the stator;

energizing the phase winding by actuating switch means to control the current in the winding;

freewheeling in each phase inductance cycle so that current in the winding recirculates for an interval at an estimate of a predetermined position of the rotor at which the rate of change of phase current is at a predicted magnitude;

monitoring the phase current during freewheeling;

comparing the monitored rate of change of phase current with that predicted at the predetermined position; and deriving the position of the rotor relative to the predetermined position from the difference between the monitored and predicted rates of change of phase current.

2. A method as claimed in claim 1 in which the interval is coincident with a period of substantially no change in current as the rotor moves.

3. A method as claimed in claim 1, including sampling the current at or near the start and at or near the end of the freewheeling interval.

4. A method as claimed in claim 3 including calculating the rate of change of current from the change of current over the period of sampling.

5. A method as claimed in claim 1, in which the extent of the interval is inversely dependent on the speed of movement of the rotor.

6. A method as claimed in claim 1 in which the difference between the monitored and predicted rates of change of phase current is used to modify the estimate for a subsequent phase inductance cycle.

7. A method as claimed in claim 6 in which the machine is a multi-phase machine having a phase energization sequence, the difference between the monitored and predicted rates of change of phase current being used to modify the estimate for the next phase in the sequence.

8. A method as claimed in claim 1, including monitoring the freewheeling current at the switch means carrying the freewheeling current.

9. A method as claimed in claim 1, including monitoring the freewheeling current at the phase winding.

10. A rotor position indicator for a reluctance machine having a rotor, a stator and at least one phase winding, the indicator comprising:

a current monitoring device for deriving a signal indicative of phase current in the phase winding;

switch means for configuring a freewheel circuit in which current recirculates through the winding;

timing means for actuating the switch means to configure the freewheel circuit for an interval coincident with a predicted range of rotor position, and for sampling the phase current to measure the rate of change of current in the freewheeling circuit in the interval; and comparator means for comparing a predicted rate of change of phase current with the measured rate of change of phase current to derive a difference value indicative of the difference between actual rotor position and the predicted rotor position.

11. An indicator as claimed in claim 10 in which the timing means is responsive to a signal indicative of the speed of movement of the rotor to vary the period in inverse relation thereto.

12. An indicator as claimed in claim 11 in which the timing means is responsive to the difference value to adjust the actuation of the switch means in a subsequent phase cycle.

13. A system for monitoring rotor position in a reluctance machine, comprising a rotor, a stator, at least one phase winding, a switch arrangement operable to configure the phase winding in a freewheel circuit in which a freewheel current recirculates in the winding, a current monitoring device for deriving a signal indicative of the freewheel current, a timing device for actuating the switch arrangement into the freewheel configuration for an interval at an estimate of a predicted position of the rotor at which the rate of change of current has a predicted value, a device for deriving a measurement of the rate of change of current from the current monitoring device in the interval, and a device for calculating the position of the rotor relative to the predetermined position from a comparison of the derived and predicted rates of change of current.

14. A system as claimed in claim 13 in which the interval is arranged to be coincident with a period of substantially no change in current.

15. A system as claimed in claim 13 in which the device for deriving a measurement of the rate of change of current includes a sampling device for sampling the current at or near the start and at or near the end of the interval.

16. A system as claimed in claim 13 in which the timing device is operable to modify the estimate for a subsequent phase cycle in response to the difference between the derived and predicted rates of change of current.

17. A system as claimed in claim 16 in which the machine is a multi-phase machine having a phase sequence wherein the timing device is operable to modify the estimate for the next phase in the sequence in response to the difference between the derived and predicted rates.

* * * * *